May 2, 1933.  W. F. GROENE  1,906,577
STEADY REST FOR CRANK SHAFT LATHES
Filed June 7, 1928
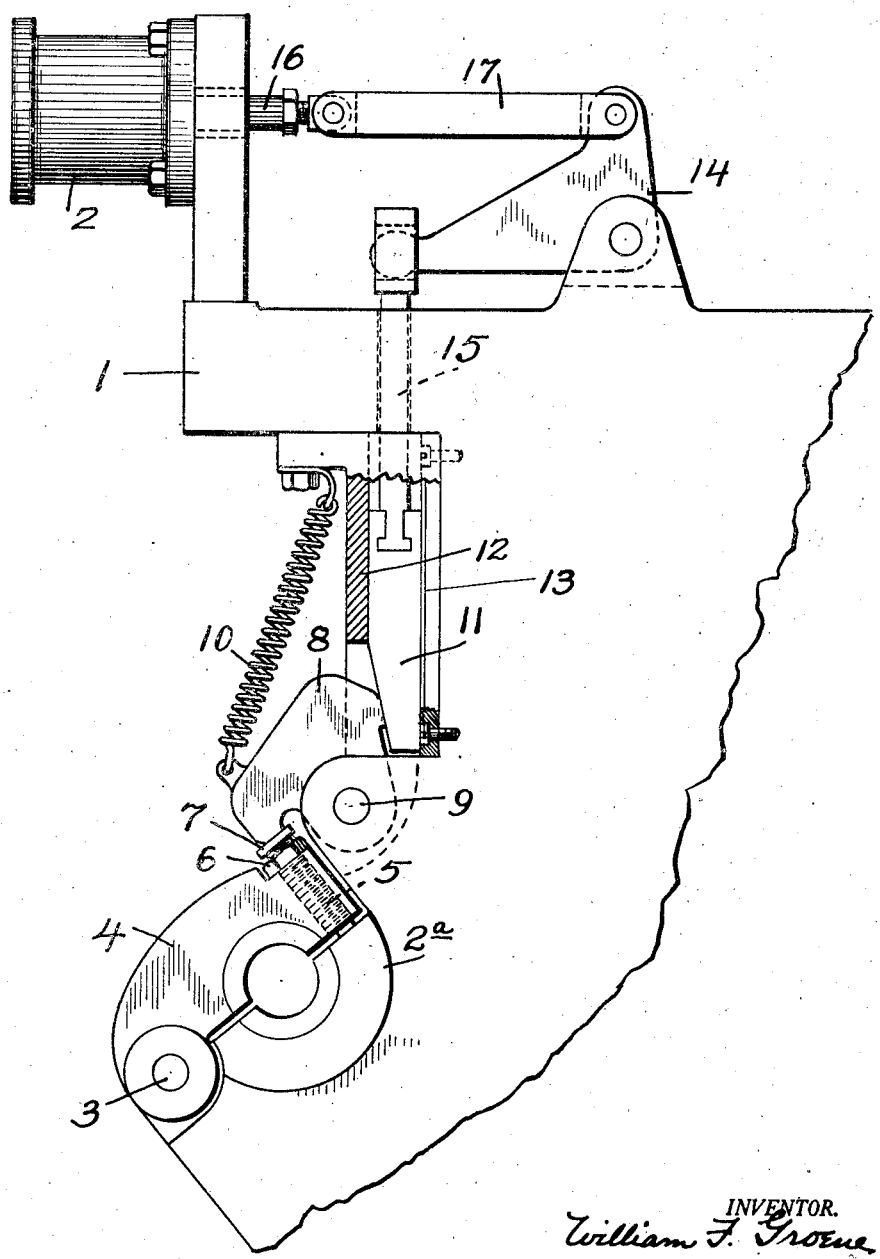
INVENTOR.
William F. Groene
BY
Allen & Allen
ATTORNEY.

Patented May 2, 1933

1,906,577

UNITED STATES PATENT OFFICE

WILLIAM F. GROENE, OF CINCINNATI, OHIO, ASSIGNOR TO THE R. K. LEBLOND MACHINE TOOL COMPANY, OF CINCINNATI, OHIO, A CORPORATION OF DELAWARE

STEADY REST FOR CRANK SHAFT LATHES

Application filed June 7, 1928. Serial No. 203,712.

My invention relates to devices whereby the bearings of crank shafts which are being turned in a lathe may be held in steady position.

It has been found in automatic crank shaft lathes, particularly where the turning of all of the pins at one operation is an objective, that unless great care is taken in mounting the journals of the shaft, the tremendous working strains will set up vibrations which build up to the extent of causing the machine itself to break down, as well as ruining the work and the tools.

To the end of providing a steady rest or journal support for the shaft during the turning operation, in which the shaft is revolved and the tools follow around with the pins being turned, I have devised a power operated rest which is certain and definite in its operation, permits the introduction of the shaft thereinto while being moved in a horizontal plane, and in which adjustments can be readily made without affecting the positive application of power. More specifically I operate the power steady rest by means of compressed air or other source of pressure, which advances a wedge that holds the steady rest closed, as regulated by a suitable stop. This wedge is formed at an angle which will prevent its being forced back against the power applied, but I propose in addition to this to maintain the power application to the wedge during the working cycle of the machine, and then to reverse the power so as to forcibly withdraw the wedge, thus permitting the rest to be opened.

I accomplish my objects by that certain construction and arrangement of parts of which a typical example will be hereinafter more specifically pointed out and described, and the novelty in which will be duly claimed.

In the drawing:—

The figure is a side elevation, partly in section, showing a single steady rest, constructed according to my invention.

The frame of a lathe is shown at 1, and a power cylinder 2 mounted thereon applies the power for the operation of the steady rest.

The steady rest is shown as of any desired type, the simple one illustrated formed of a fixed journal half 2$^a$, and hinged thereto at 3, a journal half 4. An abutment screw 5, having a lock-nut 6 and a head 7, is set into the pivoted half, and serves to control the degree of closure thereof over the fixed half when the device is in operation.

A clamping dog 8 is pivoted in the frame at 9, and at the forward end bears against the head of the abutment screw. This clamp is engaged by a spring 10 which tends to keep it open.

The rear face of the clamp lies in contact with the sloping face of a wedge bar 11. This bar is held to the face of the frame by means of a plate 12, and the frame is faced within the housing so provided, by means of a removable slide bearing plate 13.

The wedge bar, when forced down, throws the clamp against the abutment screw and holds the steady rest positively closed to the degree permitted by the screw 5.

The wedge is operated by means of a lever plate 14 which has a ball crank joint with a plunger 15 that engages in the head of the wedge bar. The lever plate 14 is linked to the piston rod 16 of the power cylinder by means of a link 17.

As so constructed, the steady rest when open, permits the ready insertion of the journal of a crank shaft thereinto without dropping the shaft down. With a proper adjustment of the abutment screw the movable half journal is swung over the shaft, and power applied to force down the clamp plate which is normally out of the way as held by its spring.

When power is applied by means of the power cylinder, the wedge bar is forced down, which moves the clamp to the position shown in the drawing, thus positively holding the steady rest closed. Until the power is applied the upward position of the clamp will be apparent to the eye. When the power is applied it stays on until the work is done, and thus will force the wedge to the tightest position and keep it there, the slope of the wedge face in any event being such that pressure applied to the clamp will not force it back.

When the shaft is to be removed the power cylinder is reversed, which withdraws the wedge, permitting the spring to open the clamp, which then permits the pivoted journal half to be thrown open and the shaft to be lifted out as readily as it was inserted.

Having thus described my invention, what I claim as new and desire to secure by Letters Patent, is:—

1. A steady rest for lathes comprising a fixed bearing element and a movable bearing element, a movable clamping element to engage the movable bearing element and hold the same closed, means for holding said clamping element open except when power is applied thereto to close it, means for applying power to said clamping element, said means including a wedge and connections from the source of power thereto.

2. A steady rest for the purpose described, comprising a fixed bearing element, a bearing element hinged with relation thereto and complementary to the fixed element, an abutment screw in the hinged bearing element to contact with the fixed bearing element and control the spacing of the elements when said elements are closed, a clamping element arranged to abut against the head of said abutment screw, power means, and an operative connection from said means for driving the clamping element.

WILLIAM F. GROENE.